UNITED STATES PATENT OFFICE.

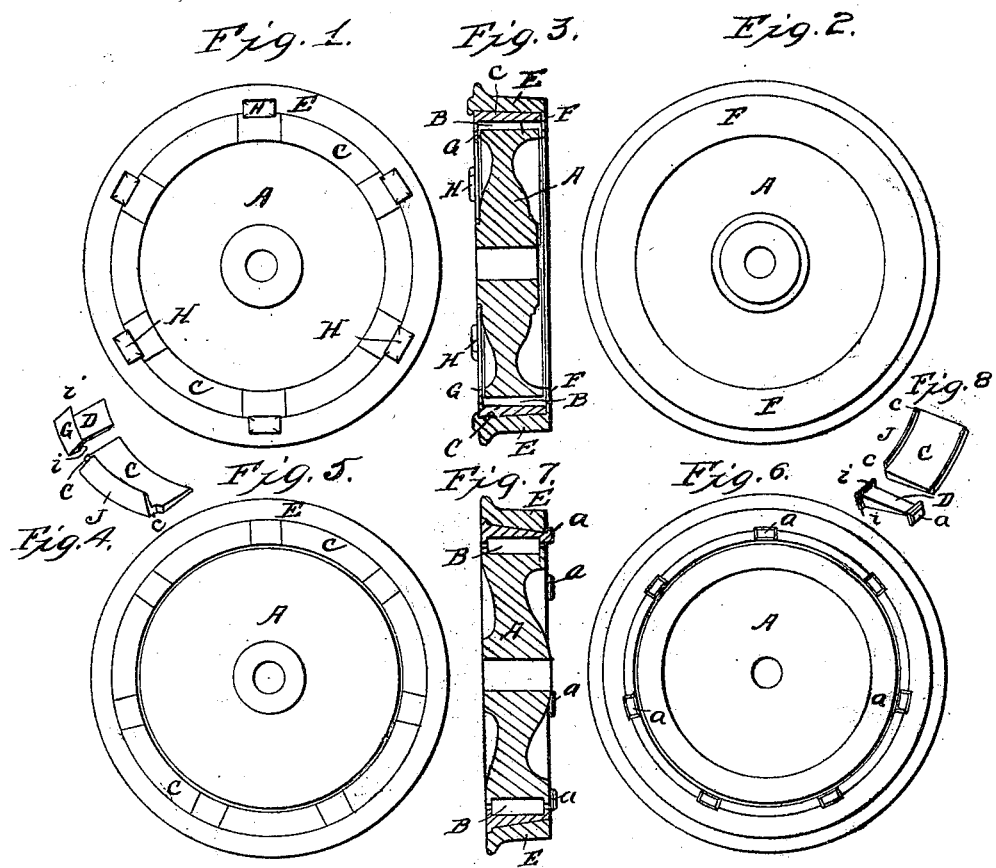

NEHEMIAH HODGE, OF ADAMS, MASSACHUSETTS.

RAILROAD-CAR WHEEL.

Specification of Letters Patent No. 8,979, dated June 1, 1852.

*To all whom it may concern:*

Be it known that I, NEHEMIAH HODGE, of Adams, in the county of Berkshire and State of Massachusetts, have invented certain new and useful Improvements in Railroad-Car Wheels; and I do hereby declare the following to be a full, clear, and exact description of the same, reference being had to the accompanying drawings, making a part thereof, in which—

Figures 1 and 2, represent views of the opposite sides of one of my wheels. Fig. 3, represents a section through the center thereof. Fig. 4, represents a perspective view of one of the segments and keys, detached, and which secures the whole together. Figs. 5, 6, 7, and 8, respectively represent similar views of a modification of my general plan.

Similar letters in the several figures represent the same parts.

The general principle, of connecting the tread or rim of a car wheel, to the hub or central part thereof by means of india rubber or other analogous elastic material, such elastic material being connected with the outer periphery of the central part of the wheel by a groove on the latter or its equivalent, and to the inner periphery of the rim, also by a groove thereon or its equivalent; the india-rubber holding itself in both grooves by its elasticity and giving to the wheel lateral as well as radial elasticity, is fully set forth and claimed in the patent granted to me on the 18th day of November A. D. 1851, and need not again, except so far as to show how this principle may be modified, without virtually changing it, be described.

My present invention relates more particularly to the manner of constructing the segmental ring and keys, for the purpose of facilitating the insertion of the ring or band of india-rubber or other analogous elastic material, and of confining said segmental metallic ring in its place as the means of fastening and holding the wheel firmly together.

To enable others skilled in the art to make and use my invention, I will proceed to describe the same with reference to the drawings, which fully represent the same.

The central portion A, is provided with a hub, as in the usual construction of car wheels, to connect it with the axle, and its outer periphery may have a groove formed therein, as seen in section at Fig. 7, or, it may have a plain surface, as seen in the section at Fig. 3, for the reception of the band of india rubber, or other equally elastic material B. In the latter case the groove as it were, instead of being on the periphery of the said central portion, is formed in the india rubber or other material itself, and which latter plan may be found preferable. The india-rubber ring may be formed in segments, if found advantageous, but no objection has as yet been found, to the using of it in one piece. The india-rubber ring is surrounded by a metallic ring C, in segments, with keys D, interposed between the ends of each of the segments, so as to form a full circle, and so that when in place the whole will be firmly held together. The rim E, is constructed with a flange on one of its sides, as in the usual form for guiding it on the track, and on the other side may be cast a reversed flange F, Fig. 3, between which and the side of the central portion of the wheel, the india rubber is interposed, so as to take the lateral pressure between the face of the said central portion A, and the said flange F. The pressure on the opposite side coming on the india rubber between the opposite face, and the flanges G, on the keys D, and the flanges J, on the segments C. The difference, between this arrangement and that which was secured to me by Letters Patent aforesaid, or that shown in Fig. 7 of the drawings, is not in the principle, but a transposition of the groove from the metal to the rubber, and the taking of the lateral elasticity upon the faces of the central portion of the wheel instead of the sides of the groove, and which cheapens and simplifies the construction, and still retains the solidity of the wheel.

When the wheels are constructed as represented in Figs. 1, 2, 3, the lugs or projections H, H, &c., corresponding in number with the number of keys or segments to be used, are cast solid upon the face of the rim, and are made to project slightly over the inner periphery of said rim, so that the keys when in place shall catch underneath said projections or lugs, which together with the radial elasticity of the India rubber bands holds them firmly in place.

Figs. 5, 6 and 7, represent a modification of the above described plan, where the projections, instead of being cast with or forming a part of the rim, are formed on the end of the key as shown at *a*, Figs. 7, 8, in which latter case the keys pass entirely through the wheel, and said projections catch over the rim or outer portion of the wheel, as also the projections on the other ends of the key on the opposite side thereof. In the first plan, which I prefer on account of the simplicity of the segment and key, the key is only shown on one face of the wheel, the flange F, on the other face covering its other end. In both cases shoulders *c*, *c*, are cut upon the segments C, into which are fitted corresponding projections *i*, *i*, on the keys, they being so dovetailed or formed that, when in place they form a perfect ring, the keys catching underneath the lugs as in the one case, and over the rim as in the other case are firmly held thereby, and by the radial elasticity of the India rubber ring. The projections on the keys catching or fitting into the dove tailed shoulders cut in the segments, together with the elasticity of the rubber ring, holds the said segments firmly in place, and thus forming an entire wheel made of parts substantially and firmly put and held together.

The manner of putting the wheel together by means of a hydraulic or other power press is fully explained in my patent before referred to. The present construction admitting however, of greater facilities, for in my former method, the segments had all to be pressed in simultaneously, while by the use of the keys the segments may all be placed in their proper positions, and the keys alone forced in, which when in place hold the segments firmly in their seats.

The general construction of my wheel is also fully set forth in the Letters Patent before referred to, and need not again be minutely described.

The invention as herein described, consisting in the method of combining the parts with a view to strength, simplicity, and economy, and which may be considered as the changing of the grooves and projections as set forth in my former patent from one portion to another of the wheel, and the introduction of the keys between the segments, for the purpose of expediting the insertion of the India rubber or for the removing of the same, with due regard to the object to be attained.

Having thus fully described the nature of my invention what I claim therein as new and desire to secure by Letters Patent, is,

In the construction of car wheels, the combination of the segmental ring and keys, constructed substantially as described, or their equivalents, for the purpose of facilitating the insertion of the ring or band of India rubber, or other elastic material, between the central portion and the rim of the wheel, and as a means of fastening or holding the whole together as herein set forth and shown.

NEHEMIAH HODGE.

Witnesses:
A. C. DONN,
A. B. STOUGHTON.